May 11, 1943.  A. A. KOTTMANN ET AL  2,319,140
LUBRICATING DEVICE FOR BREAD SLICERS
Filed May 28, 1941  2 Sheets-Sheet 1
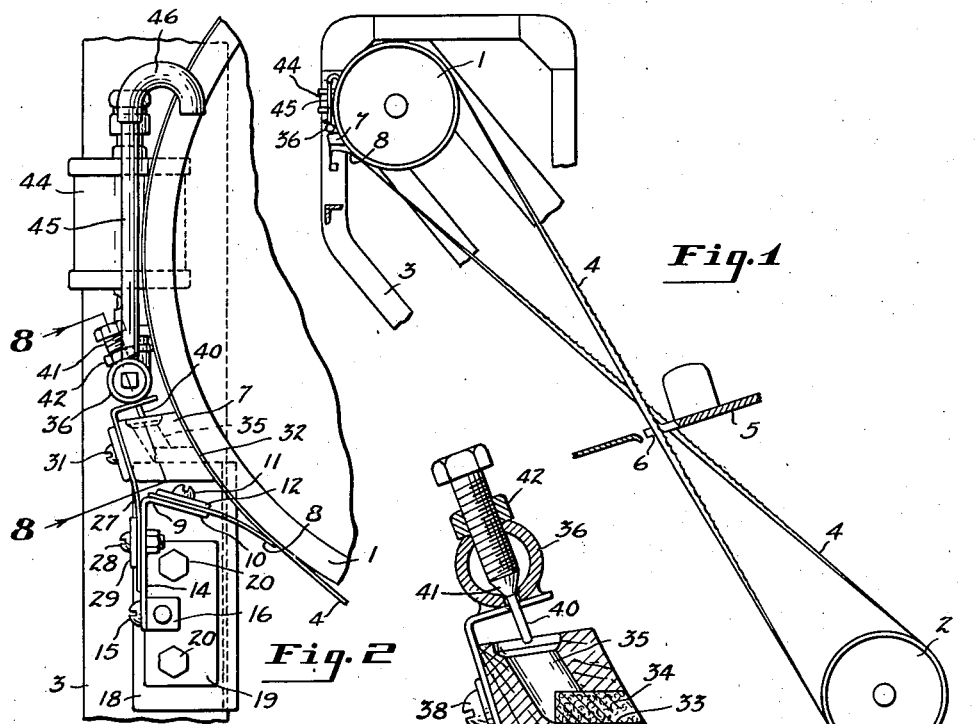
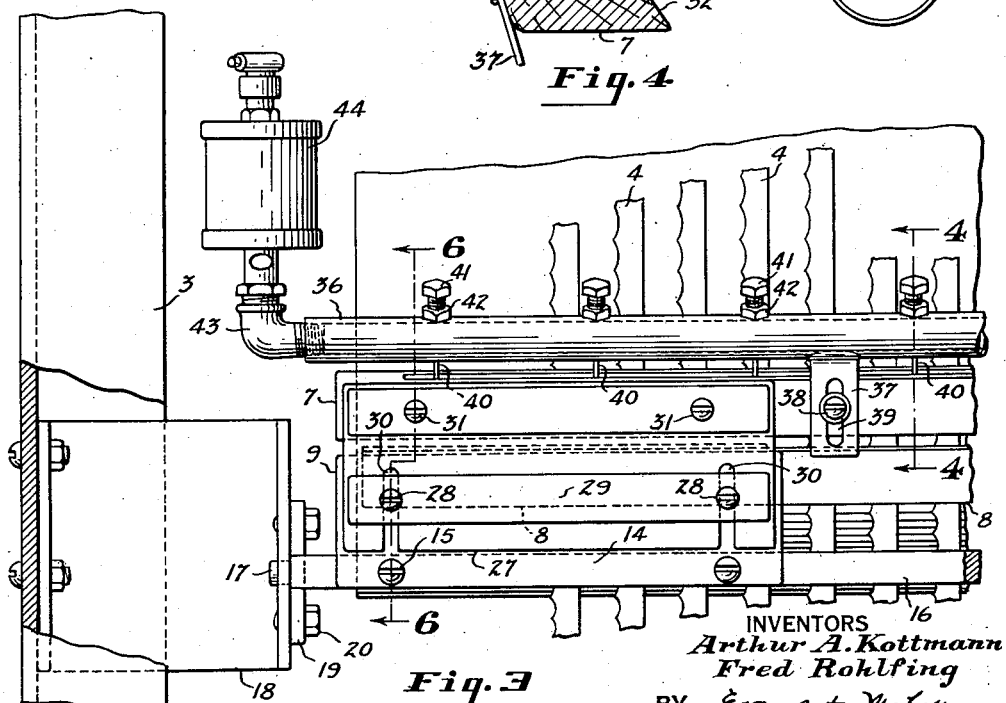
INVENTORS
Arthur A. Kottmann
Fred Rohlfing
BY Evans + McCoy
ATTORNEYS May 11, 1943.  A. A. KOTTMANN ET AL  2,319,140
LUBRICATING DEVICE FOR BREAD SLICERS
Filed May 28, 1941  2 Sheets-Sheet 2
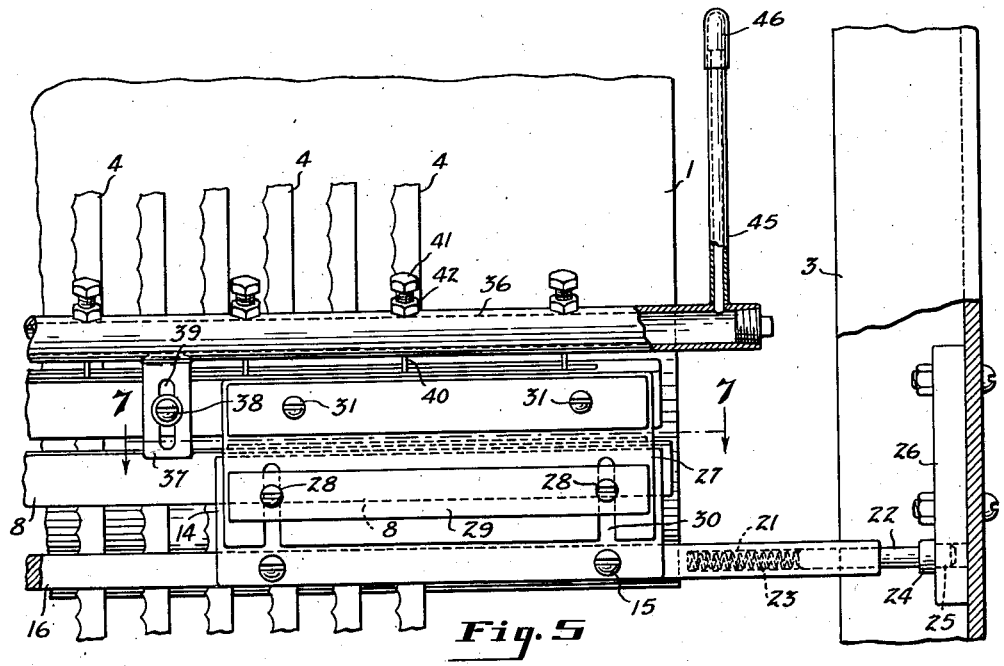
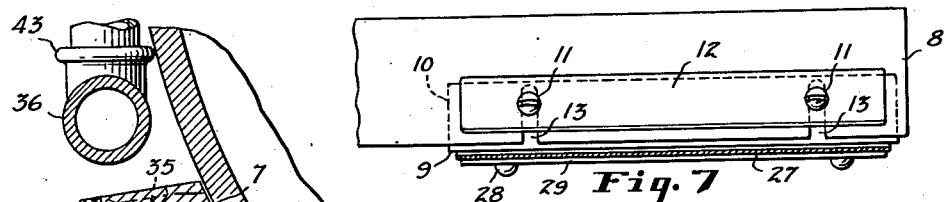
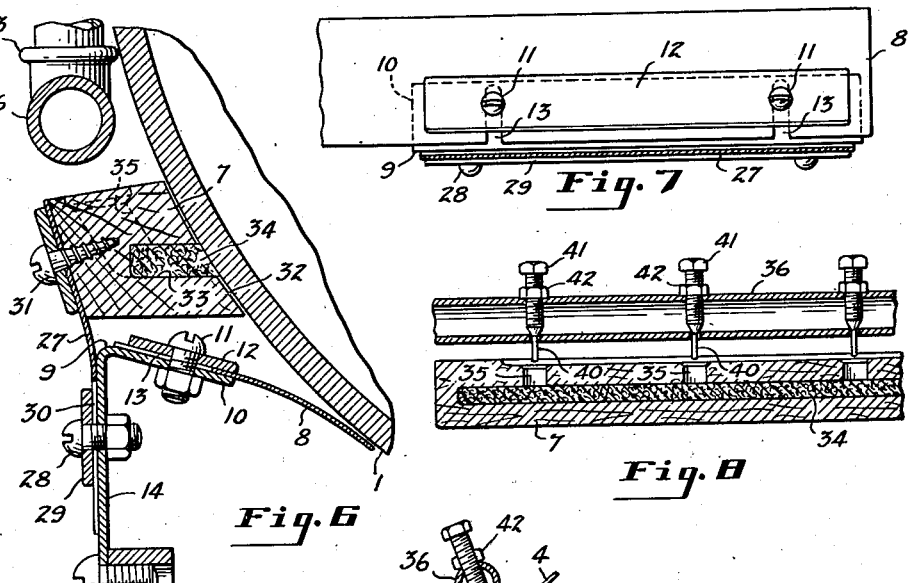
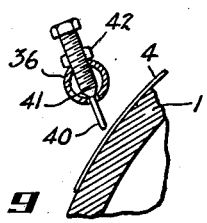
INVENTORS
Arthur A. Kottmann
Fred Rohlfing
BY Evans + McCoy
ATTORNEYS Patented May 11, 1943

2,319,140

UNITED STATES PATENT OFFICE 2,319,140

LUBRICATING DEVICE FOR BREAD SLICERS

Arthur A. Kottmann and Fred Rohlfing, Davenport, Iowa, assignors, by mesne assignments, to The Bettendorf Company, a corporation of Maryland Application May 28, 1941, Serial No. 395,618

10 Claims. (Cl. 146—88)

This invention relates to bread slicing machines of the endless band blade type, and particularly to means for preventing the accumulation of glutinous material on the blade surfaces, the present invention being an improvement on copending application of Kottmann, Bennett and Keast, Serial No. 367,998, filed November 30, 1940.

An object of the present invention is to provide a unit for supplying lubricant to band slicer blades in controlled amounts and to controlled points of application.

A further object of the present invention is to provide a readily removable lubricating and blade scraping unit which carries a supply of lubricant adequate for lubricating the blades throughout a long period of operation.

A further object is to provide a lubricating device comprising a blade scraper and a lubricating device including an oil reservoir in the form of a unit detachably mounted in the frame with the scraper and lubricant applying device engaging the blades on a pulley.

With the above and other objects in view the invention may be said to comprise the lubricating device as illustrated in the accompanying drawings hereinafter described and particularly set forth in the appended claims, together with such variations and modifications thereof as would be apparent to one skilled in the art to which the invention pertains.

Reference should be had to the accompanying drawings forming a part of this specification, in which:

Figure 1 is a side elevation of a band type bread slicing machine showing the device of the present invention applied thereto;

Fig. 2 is an end elevation of the lubricating unit showing adjacent portions of the pulley and frame;

Fig. 3 is a front elevation of one end portion of the lubricating unit;

Fig. 4 is a section taken on the line indicated at 4—4 in Fig. 3;

Fig. 5 is a front elevation of the end portion of the lubricating unit opposite that shown in Fig. 3;

Fig. 6 is a section taken on the line indicated at 6—6 in Fig. 3;

Fig. 7 is a section taken on the line indicated at 7—7 in Fig. 5; and

Fig. 8 is a section taken on the line indicated at 8—8 in Fig. 2; and

Fig. 9 is a fragmentary side elevation showing the lubricant feed device arranged to drip oil directly upon the slicer blades.

In the accompanying drawings the present invention is shown applied to the slicing unit of a bread slicing machine which comprises spaced pulleys 1 and 2 which are supported in suitable frame members 3 and a series of endless slicing blades which run over the pulleys 1 and 2 and which are crossed between the pulleys. The blades 4 are reversed in passing from one pulley to the other and lie flat and side by side upon each of the pulleys. Adjacent the crossing point the blades are disposed in substantially parallel relation and at right angles to the portions of the blades passing over the pulleys. The bread is fed to the slicer blades along a bed 5 which is slotted to permit passage of the slicer blades and to provide suitable guide fingers 6 which hold the portions of the blades passing through the bed 5 in parallel planes and evenly spaced to provide slices of the desired thickness.

The blade lubricating unit of the present invention may have a blade engaging wiper block 7 composed of a suitable material such as hard wood. The block 7 engages the outer surfaces of the blades passing over one of the pulleys, the periphery of the pulley forming a backing for the block so that it is not possible for the blades to cut notches into the block deep enough to interfere with the movement of the blades when changed to a different spacing. The block is of a length sufficient to engage all of the blades passing over the pulley and therefore can supply lubricant to the blades in all their various spaced positions.

The lubricating unit may also have a scraper blade 8 engaging the outer surfaces of the blades at a position in which the scraper is backed by the periphery of the pulley to prevent notches of undue depth from being worn in the scraper blade. The scraper is also of sufficient length to engage all of the blades. The wiper block and scraper are carried by an angle cross bar 9 which has a flange 10 projecting inwardly toward the periphery of the pulley to which the scraper 8 is attached by means of bolts 11 and clamping plates 12, the scraper being adjustable on the flange 10 toward and away from the pulley 1 by means of slots 13 in the scraper through which the bolts 11 pass. By adjusting the scraper 8 the pressure exerted by the scraper upon the slicer blades may be increased or decreased as desired. The angle cross bar 9 has a vertical flange 14 which is attached along its lower edge by means of screws 15 to a square bar 16 which extends across the space between the side members of the frame 3.

As shown in Fig. 3, the bar 16 has a reduced cylindrical end portion 17 which fits in an opening provided in a supporting bracket 18 attached to the frame 3. A locking plate 19 is provided with a rectangular socket to receive the end of the square bar 16 and is secured to the bracket 18 by means of bolts 20. The opposite end of the bar 16 is provided with an axial bore 21 which receives an extension rod 22 which is pressed outwardly by means of a spring 23 in the bore 21. The rod 22 has an enlarged head 24 provided with reduced cylindrical bearing portion 25 which is received in an opening in a plate 26 attached to the frame 3. The entire lubricating unit is supported upon the cross bar 16 and may be removed by simply retracting the rod 22 against the spring 23 sufficiently to release the head 24 from the plate 26. To mount the lubricating unit it is simply necessary to insert the rod end 17 in the opening provided in the bracket 18 and permit the rod 22 to be extended into engagement with the supporting plate 26.

The wiper block 7 is supported from the bar 9 by means of resilient brackets 27 which are attached at their lower ends to the flange 14 of the bar 9 by means of bolts 28 and clamping plates 29, the brackets 27 being adjustable vertically to vary the pressure of the block 7 against the pulley by means of vertical slots 30 in the bracket through which the bolts 28 pass. By loosening the bolts 28, the brackets 27 may be adjusted vertically and may be clamped in adjusted position by again tightening the bolts 28. The blocks 7 are secured to the brackets 27 by suitable means such as screws 31. The inner face 32 of the block 7 is curved to conform to the curvature of the periphery of the pulley 1, and the block is provided with a longitudinal channel 33 opening to the curved face 32 and a lubricant applying pad 34 of suitable absorbent material is mounted in the channel 33.

The lubricant applying pad 34 is particularly desirable when operating conditions of the slicing machine require that the blades' spacing be changed occasionally. Lubricant passages such as 35 are provided in the block 7 so that the pad or wick 34 will be moistened at a number of points along its length, and, consequently, will be moistened evenly.

Immediately above the block 7 and extending the full length thereof is mounted a pipe 36 which is supported on brackets 37 attached to the block 7. The brackets 37 are adjustably connected to the block 7 so that the pipe 36 may be adjusted vertically with respect to the block 7, the brackets 37 being attached to the block by means of screw 38 which pass through vertical slots 39 in the brackets. Over each of the oil passages 35, the pipe 36 is provided on its underside with an outlet through which oil may be delivered from the pipe to the wick.

To prevent the wick from feeding oil faster than required, the flow through the outlets in the pipe 36 is controlled by means of the needle valves 41 having extended needles 40 projecting toward the openings of passages 35. These needle extensions 40 serve to collect the oil, which flows through the outlets at a very low rate, in droplet form and thereby prevents the oil from creeping along the underside of pipe 36. When the droplets collected at the ends of the needles 40 have reached sufficient size, they fall into their associated passages 35, which in this instance is the exact point of oil application desired.

Each needle valve is threaded into the pipe so that it may be adjusted by a turning movement to increase or decrease the area of the passage around the needle, and each valve is provided with a lock nut 42, by which it may be secured in an adjusted position. By properly adjusting the valves 41, the delivery of lubricant may be accurately regulated.

At one end of the pipe 36 there is an upwardly extending elbow 43 to which is attached a suitable oil cup or reservoir 44 adapted to contain a suitable supply of lubricant. The body of the reservoir is above the level of the pipe 36 so that lubricant flows by gravity. At the opposite end of the pipe 36 a vent tube 45 extends upwardly to a height greater than that of the oil reservoir and this vent tube is provided with a downturned upper end 46. The vent tube 45 permits air to escape freely from the pipe so that there is an uninterrupted gravity feed from the reservoir 44, the pipe 45 opening to the atmosphere above the reservoir so that the level of oil in the vent pipe is always below the top of the vent. The downturned upper end 46 prevents the entry of dust or other foreign material into the oil pipe.

While the block and wick arrangement is preferable for slicers in which the blade spacings are changed occasionally, the blocks are not essential in those slicers in which the spacing always remains fixed. In such slicers the needle valves can be arranged to drip lubricant directly upon each blade or upon any part of the machine structure directly contacted by the blades, as shown in Fig. 9. Accurate regulation of the flow of lubricant is provided by the needle valves and, when the position of the blades is fixed, the application of the lubricant to the proper points on the blades and drum may be obtained by properly spacing the drip outlets.

The blade lubricating and scraping unit is so designed that it is adapted to be attached to a standard bread slicing machine without any alteration in the machine and the mounting is such that the unit can be easily removed whenever desired. It will be seen that we have provided a means for keeping the glutinous accumulation on the blades in a soft condition so that it may be removed either by scraping of the blades through the associated parts of the slicing machine or if desired by the addition of a scraper blade. The lubricating and scraping unit of the present invention as shown is applied to only one of the pulleys on the bread slicing machine. However, it is to be understood that the unit may be applied to either or both of the pulleys and the oil pipe may be applied at the pulleys or at any other point in the travel of the blades.

The block 7 applies lubricant to the outer faces of the slicer blades and to the periphery of the pulley intermediate the blades. The inner faces of the blades are lubricated by the pulley surfaces. The lubricant on the blades and pulleys lessens the tendency of glutinous material from the bread to adhere to the blades and pulley surfaces, and keeps in a soft condition that which does adhere to the blades. It has been found the under usual conditions the block 7 satisfactorily performs the function of a scraper and, except where severe conditions are encountered, the scraper blade 8 need not be added.

It is to be understood that variations and modifications of the specific devices herein shown and described for purposes of illustration, may be made without departing from the spirit of the invention.

What we claim is:

1. In a bread slicing machine having a pair of spaced pulleys and a series of flat endless cutter blades spaced apart and running over said pulleys, a wiper block extending longitudinally of a pulley, said block having an engaging face curved to conform to the periphery of the pulley and engaging the blades passing over the pulley, said block having a longitudinal channel opening to the curved face thereof and passages leading to said channel, a lubricant applying pad in said channel, and an oil supply conduit having valve controlled outlets for delivering oil to said passages.

2. In a bread slicing machine having a pair of spaced pulleys and a series of flat endless cutter blades spaced apart and running over said pulleys, a wiper block extending longitudinally of one of said pulleys, said block having an engaging face curved to conform to the periphery of the last mentioned pulley, said block having a longitudinal channel opening to the curved face thereof, means for pressing said block against the pulley, a lubricant applying pad in the channel, means for supplying oil to said pad comprising an oil conduit parallel with and adjacent the block and having spaced valve controlled outlets, and passages in said block for receiving oil from said conduit and delivering the same to said channel.

3. In a bread slicing machine having a pair of spaced pulleys and a series of flat endless cutter blades spaced apart and running over said pulleys, a wiper block extending longitudinally of a pulley, said block having an engaging face curved to conform to the periphery of the pulley and engaging the blades passing over the pulley, said block having a longitudinal channel opening to the curved face thereof and passages leading to said channel, a lubricant applying pad in said channel, means for pivotally supporting said wiper block and for yieldably pressing the same against said pulley, an oil pipe connected to said wiper block and having outlets for delivering oil to said passages, and adjustable valves controlling said outlets.

4. In a bread slicing machine having a supporting frame, spaced pulleys and a series of flat endless cutter blades running over said pulleys, a blade scraping and oiling unit comprising a supporting crossbar parallel to one of said pulleys and adjacent the periphery thereof, said bar being attached at its ends to the frame, an elongated wiper block supported by said bar and having a face curved to conform to the periphery of the adjacent pulley, said block having a recess opening to the curved face thereof and oil passages leading to said recess, means for pressing the block against the pulley, a lubricant retaining pad in said recess, an oil pipe carried by said bar and extending lengthwise of the block, said pipe having outlets for delivering oil to said passages, an adjustable valve in each outlet, and an oil reservoir connected to the pipe.

5. In a bread slicing machine having a supporting frame, spaced pulleys and a series of flat endless cutter blades running over said pulleys, a blade scraping and oiling unit comprising a supporting crossbar parallel to one of said pulleys and adjacent the periphery thereof, said bar being attached at its ends to the frame, an elongated wiper block supported by said bar and having a face curved to conform to the periphery of the adjacent pulley, said block having a recess opening to the curved face thereof and oil passages leading to said recess, means for pressing said block against the pulley, a lubricant retaining pad in said recess, an oil pipe carried by said bar and extending lengthwise of the block, said pipe having outlets for delivering oil to said passages, an adjustable valve in each outlet, an oil reservoir connected to the pipe at one end thereof, an upright vent tube connected to the opposite end of the pipe, and a scraper attached to said bar and engaging the blades on the pulley in advance of said block.

6. In a bread slicing machine having a supporting frame, spaced pulleys and a series of flat endless cutter blades running over said pulleys, a blade scraping and oiling unit comprising a supporting crossbar parallel to the pulley and adjacent the periphery thereof, said bar being attached at its ends to the frame, a resilient scraper blade attached to said bar and engaging the cutter blades on said pulley, resilient brackets attached to said bar, an elongated wiper block mounted on said brackets for adjustment toward and away from said bar and having a cutter blade engaging face curved to conform to the pulley periphery, means carried by said wiper block for applying oil to said scraper blades, means for supplying oil to said wiper block comprising an oil pipe supported by said brackets above said block, said pipe having spaced outlets for delivering oil to said block, an adjustable valve controlling each outlet, a gravity feed oil reservoir above the pipe and supported by said pipe at one end thereof, and an air vent tube at the opposite end of said pipe extending above the reservoir.

7. In a bread slicing machine having a supporting frame, spaced pulleys and a series of flat endless cutter blades running over said pulleys, a blade scraping and oiling unit comprising a supporting crossbar parallel to the pulley and adjacent the periphery thereof, said bar being attached at its ends to the frame, a resilient scraper blade attached to said bar and engaging the cutter blades on said pulley, resilient brackets attached to said bar, an elongated wiper block mounted on said brackets for adjustment toward and away from said bar and having a cutter blade engaging face curved to conform to the pulley periphery, means carried by said wiper block for applying oil to said scraper blades, means for supplying oil to said wiper block comprising an oil pipe supported by said brackets above said block, spaced outlets on the underside of said pipe for delivering oil to said block, an adjustable needle valve controlling the flow of oil through each outlet, and an oil reservoir for supplying oil to said pipe.

8. In a bread slicing machine having a pair of spaced pulleys and a series of flat endless cutter blades spaced apart and running over said pulleys, a wiper block extending longitudinally of a pulley, said block having an engaging face curved to conform to the periphery of the pulley and engaging the blades passing over the pulley, said block having a longitudinal channel opening to the curved face thereof and passages leading to said channel, a lubricant applying pad in said channel, and an oil supply conduit having valve controlled outlets for delivering oil to said passages, said valve controlled outlets having drop collectors extending from the underside of said conduit and toward said passages.

9. In a bread slicing machine having a pair of spaced pulleys and a series of flat endless cutter blades spaced apart and running over said pulleys, a wiper block extending longitudinally of a pulley, said block having an engaging face curved to conform to the periphery of the pulley, said block having a longitudinal channel opening to the curved face thereof, a lubricant applying pad in the channel, means for yieldably pressing said block against the pulley, and means for supplying oil to said pad comprising an oil conduit parallel with and adjacent the block, spaced outlets on the underside of said pipe for delivering oil to said block, an adjustable needle valve controlling the flow of oil through each outlet, each needle valve having a drop collecting extension, and an oil reservoir for supplying oil to said pipe.

10. In a bread slicing machine having a pair of spaced pulleys and a series of flat endless cutter blades spaced apart and running over said pulleys, a lubricant applying wiper extending transversely of the blades and having an elongated pad of absorbent material engaging said blades, an oil conduit adjacent said wiper and extending longitudinally thereof, said conduit having a series of spaced outlets for delivering oil to said pad at spaced points along its length, and a manually operable valve for regulating the flow of oil from each of said outlets.

ARTHUR A. KOTTMANN.
FRED ROHLFING.